United States Patent
Sutt, Jr.

(10) Patent No.: US 7,374,384 B2
(45) Date of Patent: May 20, 2008

(54) FASTENERS FOR SECURING PALLET MEMBERS TOGETHER

(75) Inventor: Edward G. Sutt, Jr., Jamestown, RI (US)

(73) Assignee: Stanley Fastening Systems, L.P., East Greenwich, RI (US)

( * ) Notice: Subject to any disclaimer, the term of this patent is extended or adjusted under 35 U.S.C. 154(b) by 0 days.

(21) Appl. No.: 11/189,012

(22) Filed: Jul. 26, 2005

(65) Prior Publication Data

US 2007/0025829 A1 Feb. 1, 2007

(51) Int. Cl.
*F16B 15/08* (2006.01)
*F16B 35/04* (2006.01)

(52) U.S. Cl. ........................ 411/455; 411/422; 411/453; 411/451.1

(58) Field of Classification Search ................ 411/455, 411/422.4, 53, 451.1
See application file for complete search history.

(56) References Cited

U.S. PATENT DOCUMENTS

| | | | |
|---|---|---|---|
| 66,331 A | 7/1867 | Harvey | |
| 169,257 A * | 10/1875 | Goddu | ........................ 411/455 |
| 318,566 A | 5/1885 | Jones | |
| 2,055,760 A | 9/1936 | Will | |
| 2,093,610 A | 9/1937 | Kraemer | |
| 2,126,585 A | 8/1938 | Stone | |
| 3,214,875 A * | 11/1965 | Slowinski et al. | ............ 52/364 |
| 3,473,363 A | 10/1969 | Herman et al. | |
| 3,853,606 A | 12/1974 | Parkinson | |
| 3,908,884 A | 9/1975 | Schrepferman | |
| 3,980,179 A | 9/1976 | Schrepferman | |
| 4,011,785 A | 3/1977 | Schrepferman | |
| 4,718,802 A | 1/1988 | Rockenfeller et al. | |
| 4,755,091 A | 7/1988 | Potucek et al. | |
| 4,932,820 A * | 6/1990 | Schniedermeier | ........... 411/455 |
| 4,973,211 A | 11/1990 | Potucek | |

(Continued)

FOREIGN PATENT DOCUMENTS

EP    0 212 068 B1    7/1989

(Continued)

OTHER PUBLICATIONS

1 Sheet of Drawing of Deformed Nail (Blank Nail—Pallet Plus), Part No. 6DR099BDFS, Revision B, from Stanley Bostitch.

*Primary Examiner*—Katherine Mitchell
(74) *Attorney, Agent, or Firm*—Tim L. Brackett, Jr.; Nixon Peabody LLP

(57) ABSTRACT

A fastener for use in the construction of pallets is provided which includes a head having a head diameter, a single elongate shank having a nominal shank diameter, and a plurality of rings extending outwardly from the shank. Each ring had a crest and a root, with the crest being located closer to the head than the root. The fastener has a bending yield strength of about 100 ksi or greater, and a length of between about 0.5 inch and 1.75 inches. The ratio of the head diameter to the nominal shank diameter is between 2.70 and 3.37, and the plurality of rings are formed so that an average outer diameter of the crests of the rings between a middle ring and the head is greater than an average outer diameter of the crests of the rings between the middle ring and the tip.

29 Claims, 6 Drawing Sheets

U.S. PATENT DOCUMENTS

| | | |
|---|---|---|
| 5,283,280 A | 2/1994 | Whyte et al. |
| 5,741,104 A | 4/1998 | Lat et al. |
| 5,921,736 A | 7/1999 | Habermehl |
| 6,086,305 A | 7/2000 | Lat et al. |
| 6,436,474 B2 | 8/2002 | Godsted et al. |
| 6,584,915 B1 | 7/2003 | Rogers |
| 6,758,018 B2 | 7/2004 | Sutt, Jr. |
| 6,851,906 B2 | 2/2005 | Gassmann et al. |
| 2003/0145544 A1* | 8/2003 | Sutt, Jr. .................... 52/364 |
| 2006/0018732 A1* | 1/2006 | Dill et al. ................ 411/451.1 |

FOREIGN PATENT DOCUMENTS

| | | |
|---|---|---|
| EP | 0 396 889 B1 | 6/1995 |
| EP | 0 697 531 B1 | 10/1998 |
| EP | 0 926 361 B1 | 5/2003 |
| EP | 1 475 545 A1 | 11/2004 |

* cited by examiner

Ring Dimensions for 0.084 inch Nominal Diameter Shank

| RING # | Outer Diameter of crest 68 (inch) | Inner Diameter of Root 70 (inch) |
|---|---|---|
| 1 | 0.0933 | 0.0747 |
| 2 | 0.0931 | 0.0749 |
| 3 | 0.0929 | 0.0751 |
| 4 | 0.0927 | 0.0753 |
| 5 | 0.0925 | 0.0755 |
| 6 | 0.0923 | 0.0757 |
| 7 | 0.0921 | 0.0759 |
| 8 | 0.0919 | 0.0761 |
| 9 | 0.0917 | 0.0763 |
| 10 | 0.0915 | 0.0765 |
| 11 | 0.0913 | 0.0767 |
| 12 | 0.0911 | 0.0769 |
| 13 | 0.0909 | 0.0771 |
| 14 | 0.0907 | 0.0773 |
| 15 | 0.0905 | 0.0775 |
| 16 | 0.0903 | 0.0777 |
| 17 | 0.0901 | 0.0779 |
| 18 | 0.0899 | 0.0781 |
| 19 | 0.0897 | 0.0783 |
| 20 | 0.0895 | 0.0785 |
| 21 | 0.0893 | 0.0787 |
| 22 | 0.0891 | 0.0789 |
| 23 | 0.0889 | 0.0791 |
| Tip | 0.0887 | |

FIG. 6

FASTENERS FOR SECURING PALLET MEMBERS TOGETHER

BACKGROUND OF THE INVENTION

1. Field of the Invention

The present invention is generally related to fasteners. More specifically, the present invention is related to fasteners for securing pallet members together.

2. Description of Related Art

Block and stringer pallets have numerous connections that involve attaching thin deck boards to thin sub-structures with fasteners. Due to the thin sub-structures, there is little material for the fasteners to penetrate, which may create weak joints that may cause premature pallet failures. Such failures may create a need for repair. If the pallet is designed for multiple trips, such as pallets that are leased rather than purchased, premature pallet failures may create a disruption to the distribution system. Such a disruption ultimately increases the cost of such a system.

In order to avoid premature failures, conventional pallet design and logic suggest the use of a larger or deformed shank fastener that may resist more load. However, due to the design of leased pallets, a longer fastener should not be used, due to the thickness of the boards being attached to each other. With the primary component of a typical fastener in pallet construction being steel, the use of a larger diameter fastener, deformed or not, will increase the fastener cost and, in turn, increase the cost of the pallet. Moreover, the use of a larger diameter fastener may be more apt to split harder woods, thereby creating an addition challenge.

BRIEF SUMMARY OF THE INVENTION

It is an aspect of the present invention to provide a fastener for use in thin board pallet construction that utilizes less material than the conventional fasteners, yet provides the same or better holding power than the conventional fasteners.

In an embodiment of the present invention, a fastener is provided. The fastener includes a head having a head diameter, a top surface, and a bottom surface, and a single elongate shank having a nominal shank diameter. The shank is integral with the head and extends from the bottom surface of the head along a longitudinal axis. The shank includes a tip opposite the head. The fastener also includes a plurality of rings extending outwardly from the shank. Each ring has a crest and a root, with the crest being located closer to the head than the root. A middle ring is located substantially in the center of the rings. The fastener has a bending yield strength of about 100 ksi or greater, and a length defining the distance from the top surface of the head to the shank tip. The length is between about 0.5 inch and 1.75 inches. The ratio of the head diameter to the nominal shank diameter is between 2.70 and 3.37. The plurality of rings are formed so that an average outer diameter of the crests of the rings between the middle ring and the head is greater than an average outer diameter of the crests of the rings between the middle ring and the tip.

In an embodiment of the present invention, a fastener is provided. The fastener includes a head having a head diameter, a top surface, and a bottom surface, and a single elongate shank having a nominal shank diameter. The shank is integral with the head and extends from the bottom surface of the head along a longitudinal axis. The shank includes a tip opposite the head. The fastener also includes a plurality of rings that extend outwardly from the shank. Each ring has a crest and a root, with the crest being located closer to the head than the root. A middle ring located substantially in the center of the rings. The nominal shank diameter is between about 0.050 and 0.113 inch. The fastener has a length that defines the distance from the top surface of the head to the shank tip. The length is between about 0.5 inch and 1.75 inches. The ratio of the head diameter to the nominal shank diameter is between 2.70 and 3.37. The plurality of rings are formed so that an average outer diameter of the crests of the rings between the middle ring and the head is greater than an average outer diameter of the crests of the rings between the middle ring and the shank tip.

In an embodiment of the present invention, a pallet is provided. The pallet includes a plurality of bottom boards having generally parallel top and bottom surfaces, the bottom surface of which is positioned to be in a substantially horizontal surface engaging orientation when the pallet is supported on a substantially horizontal surface. The pallet also includes a plurality of blocks having generally parallel top and bottom surfaces, the lower surface of which being disposed in engaged relation to the top surface of the bottom boards, and a plurality of middle boards having generally parallel top and bottom surfaces, the bottom surfaces of which being disposed in engagement with the upper surfaces of the blocks. The pallet further includes a plurality of top boards having generally parallel top and bottom surfaces, the bottom surfaces of which are disposed in engagement with the top surfaces of the middle boards, and a plurality of fasteners that secure the top boards to the middle boards. The fasteners include a head having a head diameter, a top surface, and a bottom surface, and a single elongate shank having a nominal shank diameter. The shank is integral with the head and extends from the bottom surface of the head along a longitudinal axis. The shank includes a tip opposite the head. The fastener also includes a plurality of rings that extend outwardly from the shank. Each ring has a crest and a root, with the crest being located closer to the head than the root. A middle ring is located substantially in the center of the rings. The fastener has a length that defines the distance from the head to the shank tip. The length is between about 0.5 inch and 3 inches. The ratio of the head diameter to the diameter of the wire is between 2.70 and 3.37. The plurality of rings are formed so that an average outer diameter of the crests of the rings between the middle ring and the head is greater than an average outer diameter of the crests of the rings between the middle ring and the shank tip.

Other aspects, features, and advantages of the present invention will become apparent from the following detailed description, the accompanying drawings, and the appended claims.

BRIEF DESCRIPTION OF THE DRAWINGS

Features of the invention are shown in the drawings, in which like reference numerals designate like elements. The drawings form part of this original disclosure, in which:

FIG. 6 is a table listing dimensions of an embodiment of the fastener of the present invention.

DETAILED DESCRIPTION OF THE INVENTION

Figure 1:
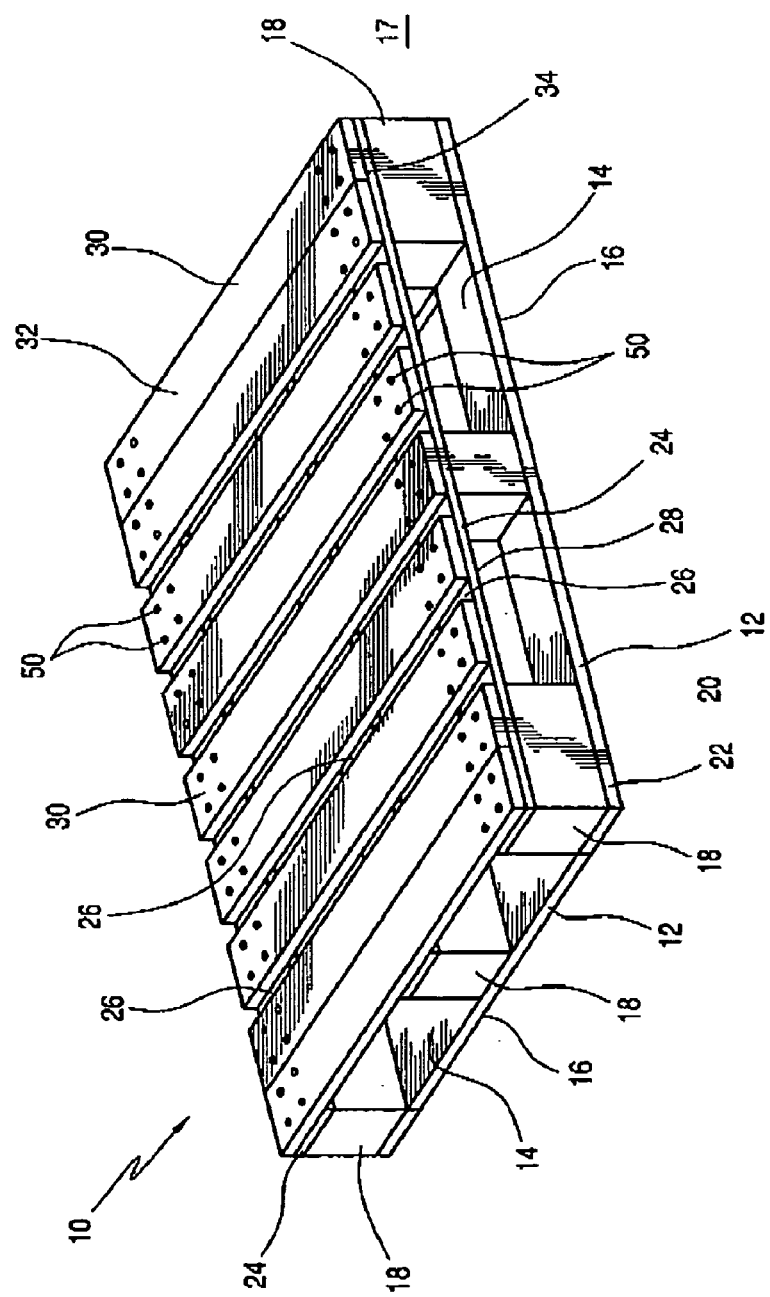
FIG. 1 is a perspective view of a pallet of the present invention.

FIG. 1 shows a pallet 10 in accordance with an embodiment of the present invention. The pallet 10 includes a plurality of bottom boards 12 that each have a top surface 14, and a bottom surface 16 that is parallel to the top surface 14. The bottom surface 16 is configured to be in a substantially horizontal surface engaging orientation when the pallet 10 is supported on a substantially horizontal surface 17, such as a floor. The pallet 10 also includes a plurality of blocks 18 that each have a top surface 20 and a bottom surface 22. The bottom surface 22 of each block 18 engages the top surface 14 of at least one of the bottom boards 12. As shown in FIG. 1, the blocks 18 are spaced apart such that tines of a lift truck may be inserted into the pallet 10, so that the pallet 10 may be lifted and moved.

In the illustrated embodiment, the pallet 10 also includes a plurality of middle boards 24 that each have a top surface 26 and a bottom surface 28. The bottom surface 28 of each middle board 24 engages the top surface 20 of at least one block 18. Preferably, each middle board 24 engages three blocks 18. The pallet 10 further includes a plurality of top boards 30, each of which has a top surface 32 and a bottom surface 34. The bottom surface 34 of each of the top boards 30 engages the top surface 26 of at least one middle board 24. Preferably, the top boards 30 are oriented substantially perpendicular to the middle boards 24. The pallet 10 further includes a plurality of fasteners 50 for securing at least some of the top boards 30 to the middle boards 24. The fasteners 50 will be described in further detail below. Of course, the pallet 10 may have any construction. The illustrated embodiment is not intended to be limiting in any way. The pallet 10 may be made of wooden boards and blocks, or the pallet 10 may be made of composite boards and blocks, or any combination thereof.

Figure 2:
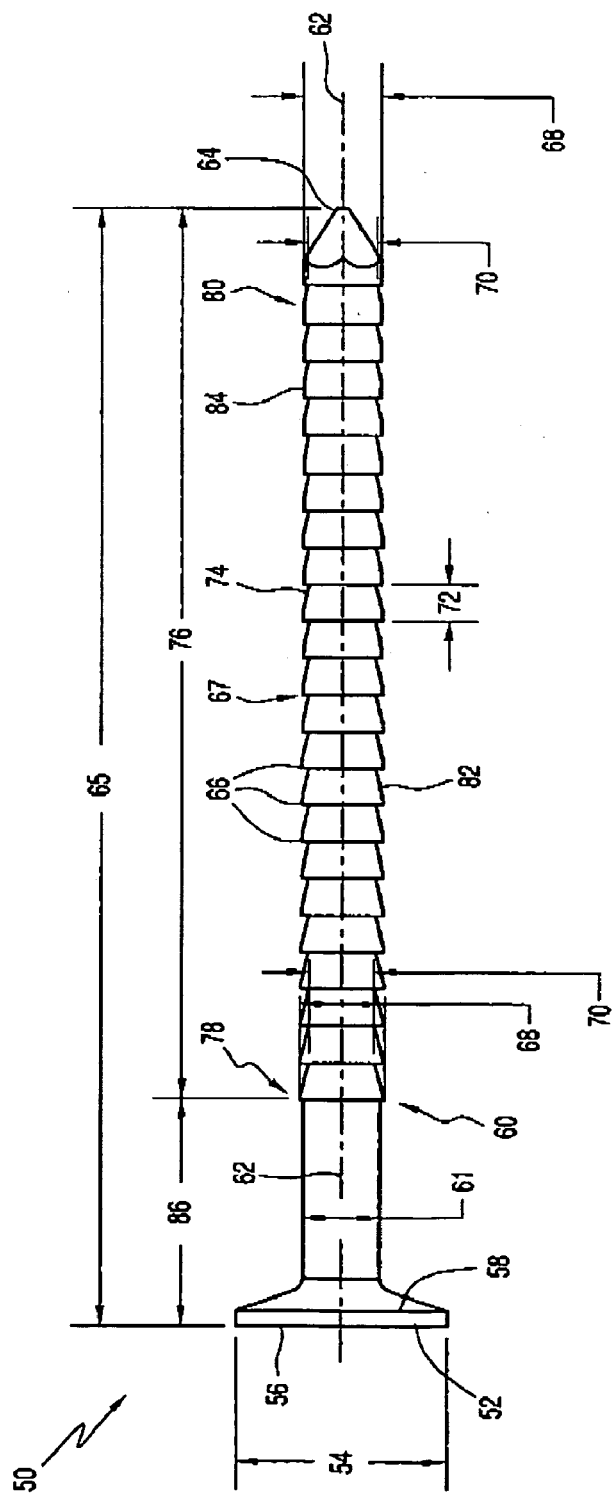
FIG. 2 is a side view of an embodiment of a fastener of the present invention.

As shown in FIG. 2, each fastener 50 includes a head 52 that defines a head diameter 54. The head 52 has a top surface 56 and a bottom surface 58. The top surface 56 of the head 52 may be substantially flat, as shown in FIG. 2, or may be concave. The fastener 50 also includes a single elongate shank 60 that is integral with the head 52 and extends away from the head 52 along a longitudinal axis 62. The head 52 and the shank 60 are preferably formed from a steel wire.

The steel is preferably a low carbon steel, such as C1012-C1023, with about 10-25% carbon. In embodiments of the invention, the fasteners 50 meet the minimum bending specification suggested by the National Evaluation Service, Inc. ("NES") for fasteners used for engineered and structural construction, even though pallet construction is not governed by such guidelines. NES requires structural nails with a shank diameter of 0.135" or less to have a minimum average bending yield strength of 100 ksi, and for nails having a shank diameter of greater than 0.135", the minimum average bending yield strength should be greater than 90 ksi. In embodiments of the present invention, fasteners 50 having a nominal shank diameter of 0.135" or less preferably have a minimum bending yield strength of greater than 100 ksi, and fasteners 50 having a nominal shank diameter of greater than 0.135" have a minimum bending yield strength of greater than 90 ksi.

A tip 64 is formed at a distal end of the shank 60, away from the head 52. The tip 64 may be pointed, or may be blunt. A length 65 of the fastener 50 that defines the distance from the top surface 56 of the head 62 to the tip 64 is preferably between about 0.5" and 3", more preferably between about 0.5" and 1.75", and even more preferably between about 0.75" and 1.75". For example, for light duty pallets, the thickness of the top and middle boards may be relatively thin so that fasteners 50 with lengths of about 0.5" may be used. Conversely, for heavy duty pallets, the top and middle boards may be relatively thick, e.g. 2" (width)×4" (height) boards, so that fasteners 50 with lengths of about 3" may be used.

The fastener 50 also includes a plurality of rings 66 (also known as barbs), as shown in FIG. 2. Each ring 66 extends outwardly from the shank 60, and is substantially in the shape of a frustum of a circular cone having a center along the longitudinal axis 62, such that each ring 66 has a crest 68 that defines an outer diameter, and a root 70 that defines an inner diameter. The crest 68 and the root 70 of each ring 66 are separated by a distance 72 that defines the height of the ring 66. As shown in more detail in FIG. 3, a surface 74 connects the crest 68 to the root 70, thereby creating the shape of the frustum of a circular cone. For each ring 66, the crest 68 is closer to the head 62 than the root 70. As would be understood by one of ordinary skill in the art, a nominal diameter 61 of the shank 60 is determined by the diameter of the wire used to manufacture the fastener 50, which is also generally the average of the outer diameters of the crests 68 of the rings 66 and the inner diameters of the roots 70 of the rings 66. Preferably, the nominal diameter 61 of the shank 60 is less than about 0.113", and more preferably between about 0.050" and 0.113". Of course, such dimensions are not intended to be limiting in any way. It is also contemplated that the nominal diameter 61 of the shank 60 may be greater than 0.113". For example, for lighter duty pallets, fasteners 50 with nominal diameters 61 of 0.050" may be used, and for heavier duty pallets, fasteners 50 with nominal diameters 61 of 0.113" and greater may be used.

In embodiments of the invention, the head diameter 54 is between about 2.70 to 3.37 times greater than the nominal diameter 61 of the shank 60. For example, the head diameter 54 of a fastener 50 with a nominal shank diameter 61 of 0.084" is between about 0.227" and 0.283", and is preferably about 0.235". In an embodiment, the fastener 50 has a nominal shank diameter 61 of 0.099" and a head diameter 54 of about 0.281", thereby yielding a head to shank diameter ratio of about 2.84. These examples of the fasteners 50 are not intended to be limiting in any way.

The number of rings 66 that are formed along the shank 60 is typically greater than about 10 rings per inch of length 76. Preferably, the number of rings 66 that are formed along the shank 60 is between about 10 rings per inch and 50 rings per inch of length 76, and more preferably, the number of rings 66 that are formed along the shank 60 is between about 20 rings per inch and 40 rings per inch of length 76. In an embodiment, the number of rings 66 that are formed along the shank 60 is about 20 rings per inch of length 76, which yields rings 66 with heights 72 of about 0.05". In another embodiment, the number of rings 66 that are formed along the shank 60 is about 32 rings per inch of length 76, which yields rings 66 with heights 72 of about 0.03". These examples are not intended to be limiting in any way.

Figure 3:
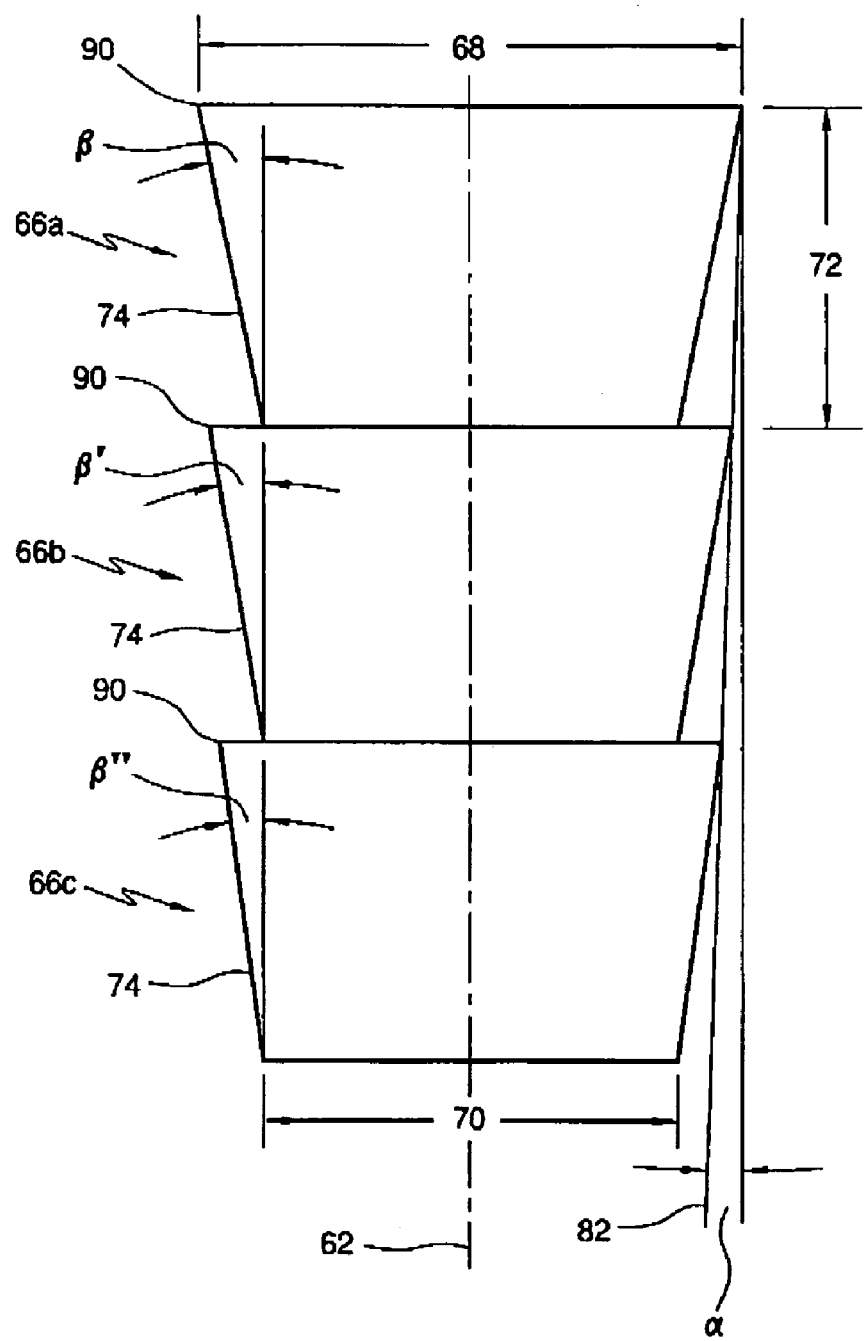
FIG. 3 is a schematic view of portions of an embodiment of the fastener of the present invention.
Figure 4:
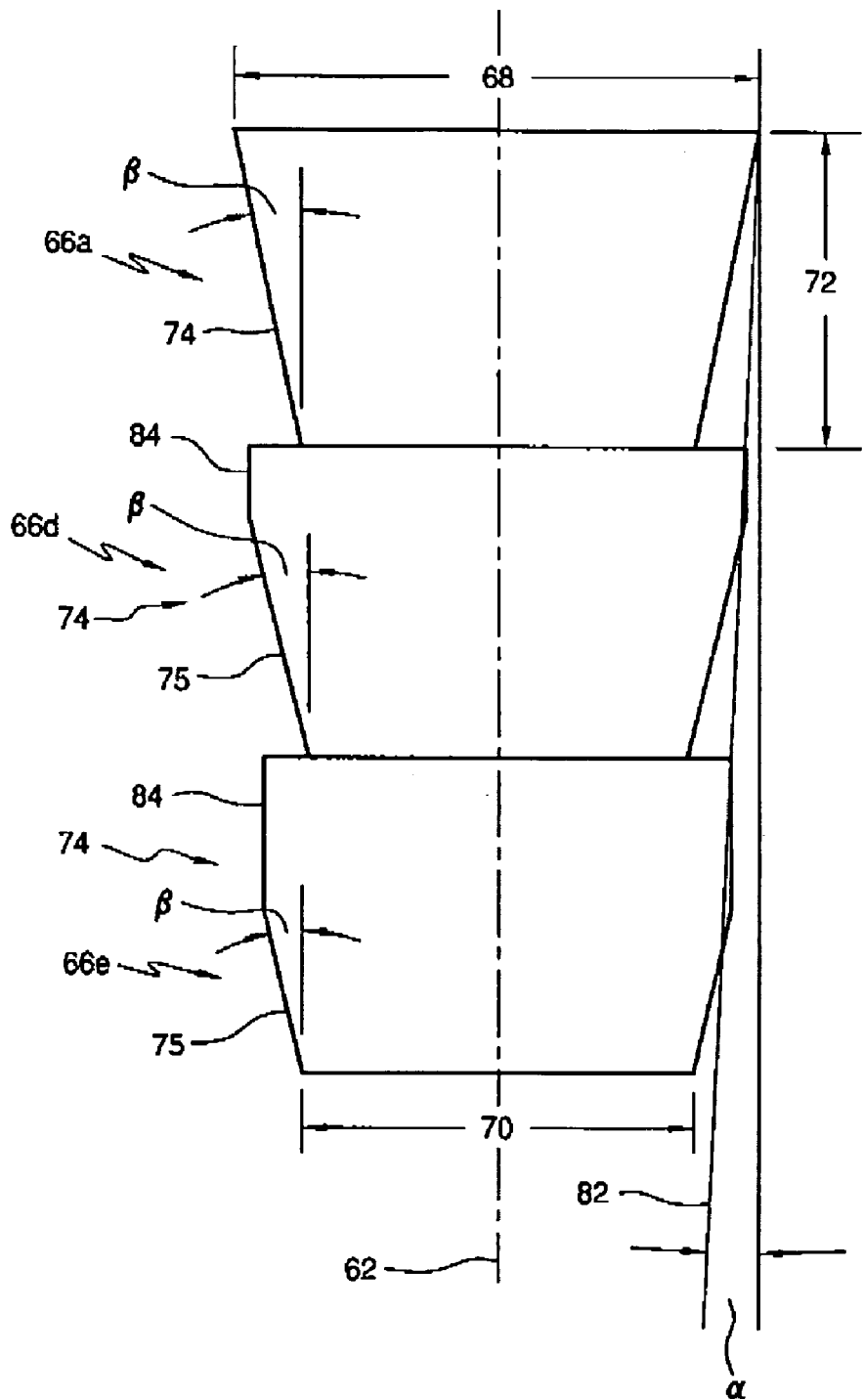
FIG. 4 is a schematic view of portions of the fastener of FIG. 2.

The rings 66 are formed so that, in general, the outer diameters of the crests 68 of the rings 66 that are disposed between a middle ring 67 and the head 54 are greater than the outer diameters of the crests 68 of the rings 66 that are disposed between the middle ring 67 and the tip 64. Such a configuration provides what may be referred to as a tapered ring shank fastener. The middle ring 67 is defined as a ring that is generally in the center of the plurality of rings 66, and is not meant to be defined as the ring that is disposed in the absolute center of the plurality of rings 66, particularly when the number of rings 66 is an even number. In an embodiment of the invention, the outer diameter of the crest 68 of an uppermost ring 78 that is closest to the head 62 is greater than the outer diameter of the crest 68 of the lowermost ring 80 that is closest to the tip 64. Preferably, the taper is generally constant along the length of the fastener between the uppermost ring 78 and the lowermost ring 80 such that the outer diameters of the crests 68 of the rings 66 generally decrease at a rate of at least about 0.0026" per inch of length 76 of the portion of the shank 60 that has the rings 66, as shown in FIG. 2. More preferably, the outer diameters of the crests 68 of the rings 66 generally decrease at a rate of about 0.004" per inch of length 76. Of course, the present invention is not limited to these values. For example, it is contemplated that the outer diameters of the crests 68 of the rings 66 may generally decrease at a rate of about 0.015" per inch of length 76. In an embodiment, a plane, represented by line 82, that generally intersects each of the rings 66 at their respective crests 68 intersects the longitudinal axis 62 at an angle $\alpha$, as shown in FIGS. 3 and 4. The angle $\alpha$ is preferably between about 0.13° and 0.52°. It is contemplated that all of the crests 68 of the rings 66 may not be intersected by the line 62. For example, in an embodiment, a ring may have a crest with an outer diameter that is less than the outer diameter of the crest of an adjacent ring that is located closer to the tip 64.

FIG. 3 is a schematic of three rings 66 of an embodiment of the fastener 50. The three rings 66 depicted include the uppermost ring 78, shown as top ring 66a, the middle ring 67, shown as middle ring 66b, and the lowermost ring 80, shown as bottom ring 66c. As shown in FIG. 3, the outer surface 74 of the top ring 66a is disposed at an angle $\beta$ relative to the longitudinal axis 62 of the shank 60, the outer surface 74 of the middle ring 66b is disposed at an angle $\beta'$ relative to the longitudinal axis 62, and the outer surface of the bottom ring 66c is disposed at an angle $\beta''$ relative to the longitudinal axis 62. As shown, the angle $\beta$ is greater than the angle $\beta'$, and the angle $\beta'$ is greater than the angle $\beta''$. This is due to the taper defined by the angle $\alpha$ discussed above. That is, by maintaining a surface 74 at a substantially constant angle between the root 70 and the crest 68, a point 90 is created at the end of the surface 74 at the crest 68, but due to the taper, the angle at which the surface 74 lies changes from one ring 66 to the next ring 66.

FIG. 4 is a schematic of three rings 66 of another embodiment of the fastener 50. The top ring 66a in FIG. 4 is the same as the top ring 66a shown in FIG. 3. As shown, the outer surface 74 of the top ring 66a is disposed at the angle $\beta$ relative to the longitudinal axis 62. The outer surface 74 of the middle ring 66d includes a portion 75 that is disposed at the angle $\beta$, but because the outer diameter of the crest 68 of the middle ring 66d is less than the outer diameter of the crest 68 of the top ring 66a, due to the taper defined by the angle $\alpha$, the outer surface 74 also includes a flat portion 84 that connects the angled portion 75 to the top of the middle ring 66d. Similarly, the outer surface 74 of the bottom ring 66e also has an angled portion 75 and a flat portion 84, as shown in FIG. 4. By keeping the angle $\beta$ constant from ring 66 to ring 66, and providing the taper at the angle $\alpha$, the length of the flat portion 84 of each ring 66 increases as the location of the ring 66 approaches the tip 64, as shown in FIG. 2.

Figure 5:
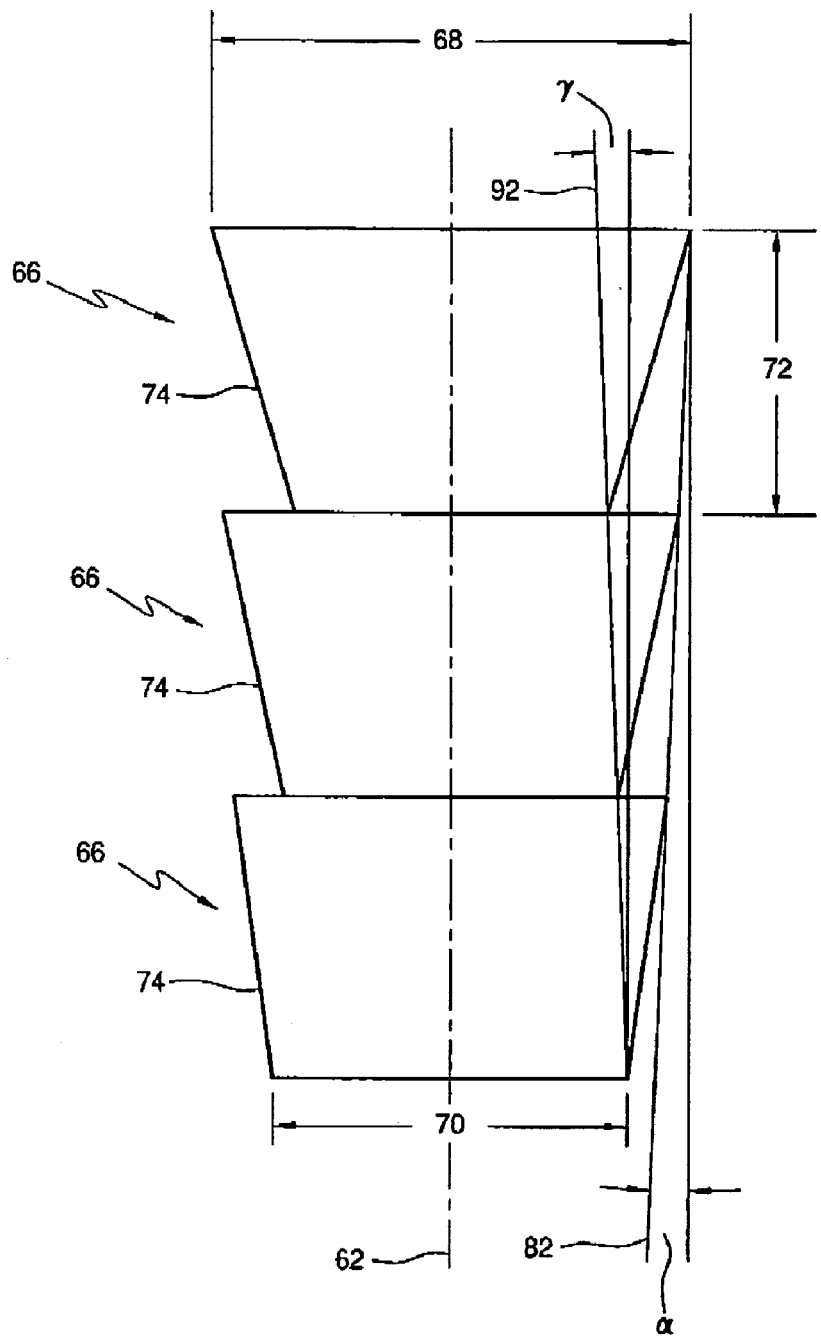
FIG. 5 is a schematic view of portions of another embodiment of the fastener of the present invention.

As shown in FIG. 5, the rings 66 may also be formed so that the inner diameter of the root 70 of the uppermost ring 78 is generally less than the inner diameter of the root 70 of the lowermost ring 80, such that a generally constant taper, defined by an angle $\gamma$ that is formed if a plane, represented by line 92, were to intersect the roots 70 of all of the rings 66. The taper for the roots 70 may be about the same as the taper described above for the crests 68, which is defined by angle $\alpha$ in FIG. 5, i.e. the angle $\gamma$ may be between about 0.13° and 0.52°. Similar to the crests 68 of the rings 66, the roots 70 may not all be intersected by the line 92, i.e., some of the roots 70 may have larger or smaller inner diameters as compared to the inner diameters of the roots 70 of rings 66 adjacent to them.

Of course, embodiments of the present invention are not limited to the embodiments shown in FIGS. 3-5. It is contemplated that other shapes of the outer surface 74 may be used. For example, the outer surface 74 may be curved or may have any other type of shape, so long as the overall taper of the crests 68 of the rings 66, described above, is maintained.

FIG. 6 shows a table that lists the outer diameters of the crests 68 and the inner diameters of the roots 70 of the rings 66 of an embodiment of a fastener 50. In this embodiment, the fastener 50 has a nominal shank diameter 61 of 0.084", a head diameter 54 of 0.235", and a length 65 of 1.5". Ring number 1 is the ring 66 is the uppermost ring 78, and ring number 23 is the lowermost ring 80. As shown in FIG. 6, the outer diameters of the crests 68 decrease by 0.002" per ring 66, and the inner diameters of the roots 70 increase by 0.002" per ring 66 from the uppermost ring 78 to the lowermost ring 80. The embodiment shown in FIG. 6 is not intended to be limiting any way, but is merely provided as an example of embodiments of the present invention.

The rings 66 may extend along the entire length of the shank 60, i.e. from the head 52 to the tip 64, or may extend along only a portion of the shank 60, as shown in FIG. 2. FIG. 2 shows a distance 86 between the top surface 56 of the head 52 and the uppermost ring 78 that is about 20% of the length 65 of the fastener 50. It is contemplated that in some embodiments, the distance 86 may be as much as 50% of the length 65 of the fastener 50. The illustrated embodiment is not intended to be limiting in any way.

It has been found that the fastener 50 accordingly to embodiments of the present invention may improve the resistance to failure of the top board 30 to middle board 24 joint of the pallet 10 of FIG. 1, as compared to the fasteners that are conventionally used, while decreasing the cost, as explained in further detail below. For example, the most common failure of a common block and stringer pallet used by a large pallet leasing company is the top board 30 to middle board 24 joint. Testing has been completed to compare an embodiment of the fastener 50 of the present invention to a conventional fastener 100 with a 0.135" diameter ringed shank and a length of 1.25". The fastener 50 used in these tests had a shank diameter of 0.099", a tapered ring shank in accordance to an embodiment of the invention discussed above, a similar length of 1.25", and a head diameter to shank diameter ratio of about 2.8.

Three sets of withdrawal tests were performed and all results indicate that the fastener 50 having a shank diameter of 0.099" performs equal to or better than the conventional 0.135" diameter fastener 100. The results of Test Group 1 are listed in Table I below. Test Groups 2 and 3, as shown in Tables II-VI, were performed at a variety of moisture contents to simulate the wooden pallet moisture content based on environmental exposure. The joints assembled and tested at 19% moisture were to simulate the load resisted by a newly constructed pallet. The joints assembled at 19% moisture and tested at 10% were to simulate the load resisted by pallets that are constructed then lose moisture content in use. The joints assembled and tested at 10% moisture were to simulate the load resisted by pallets that had been in service and were being repaired.

TABLE I

| Test Group 1 | | |
|---|---|---|
| | 0.099" Diameter Fastener 50 (pounds) | 0.135" Diameter Fastener 100 (pounds) |
| Mean | 131.90 | 116.29 |
| Standard Deviation | 20.87 | 41.77 |

TABLE II

| Test Group 2a - Assembled at 19% moisture and Tested at 19% moisture | | |
|---|---|---|
| | 0.099" Diameter Fastener 50 (pounds) | 0.135" Diameter Fastener 100 (pounds) |
| Mean | 133.70 | 120.09 |
| Standard Deviation | 29.91 | 27.16 |

TABLE III

| Test Group 2b - Assembled at 19% moisture and Tested at 10% moisture | | |
|---|---|---|
| | 0.099" Diameter Fastener 50 (pounds) | 0.135" Diameter Fastener 100 (pounds) |
| Mean | 159.76 | 108.50 |
| Standard Deviation | 35.41 | 34.78 |

TABLE IV

| Test Group 2c - Assembled at 10% moisture and Tested at 10% moisture | | |
|---|---|---|
| | 0.099" Diameter Fastener 50 (pounds) | 0.135" Diameter Fastener 100 (pounds) |
| Mean | 110.55 | 105.60 |
| Standard Deviation | 33.25 | 44.90 |

TABLE V

| Test Group 3a - Assembled at 19% moisture and Tested at 19% moisture | | |
|---|---|---|
| | 0.099" Diameter Fastener 50 (pounds) | 0.135" Diameter Fastener 100 (pounds) |
| Mean | 84.30 | 83.77 |
| Standard Deviation | 21.60 | 7.47 |

TABLE VI

| Test Group 3b - Assembled at 19% moisture and Tested at 10% moisture | | |
|---|---|---|
| | 0.099" Diameter Fastener 50 (pounds) | 0.135" Diameter Fastener 100 (pounds) |
| Mean | 219.7 | 228.4 |
| Standard Deviation | 24.3 | 54.9 |

TABLE VII

| Test Group 3c - Assembled at 10% moisture and Tested at 10% moisture | | |
|---|---|---|
| | 0.099" Diameter Fastener 50 (pounds) | 0.135" Diameter Fastener 100 (pounds) |
| Mean | 207.6 | 202.3 |
| Standard Deviation | 18.5 | 21.45 |

The results of the withdrawal tests were analyzed using a small sample set student "t" analysis to determine if the two sample sets are equivalent or different, with consideration of the variation of the tested samples. At a 95% confidence level, all of the 0.099" fasteners 50 in accordance with the present invention equaled or exceeded the 0.135" ringed shank fastener 100 withdrawal strength.

Because the cost of the steel wire used to create the fastener makes up between 50 and 75% of the cost of the fastener, the manufacturing cost of a fastener may be reduced by reducing the amount of the steel wire to manufacture the fastener, barring any significant process changes. The fastener 50 in accordance with the present invention with a diameter of 0.099" has approximately 45% less steel than the standard 0.135" diameter fastener 100 of the same length, yet, as shown above, has similar withdrawal strength.

The top board 30 to middle board 24 joint, as discussed earlier, is a joint susceptible to failure. These joints are typically each created with three 0.135" diameter fasteners 100. Replacing these three fasteners 100 with three 0.099" diameter fasteners 50 in accordance with the present invention, may provide a cost savings on the fastener, but may not provide a cost savings on the cost associated with the failure of the joints. Because the fasteners 50 in accordance with the present invention may utilize less steel for similar holding strength, four fasteners 50 may be used in the joint for a 25% increase in performance, while still utilizing 30% less steel. This may result in a cost savings and an increase in performance.

The foregoing illustrated embodiments have been provided solely for illustrating the structural and functional principles of the present invention and are not intended to be limiting. To the contrary, the present invention is intended to encompass all modifications, alterations, substitutions, and equivalents within the spirit and scope of the following claims.

All of the various features and mechanisms described with respect to the specific embodiments may be interchanged with the various embodiments described, or may be used with other variations or embodiments.

What is claimed is:

1. A fastener comprising:
a head having a head diameter, a top surface, and a bottom surface;

a single elongate shank having a nominal shank diameter, said shank being integral with said head and extending from the bottom surface of said head along a longitudinal axis, said shank including a tip opposite said head; and a plurality of rings extending outwardly from said shank, each ring having a crest and a root, with the crest being located closer to said head than the root, said plurality of rings having a middle ring located substantially in the center of said rings, wherein said fastener has a bending yield strength of about 100 ksi or greater;

said fastener has a length defining the distance from the top surface of said head to the shank tip, the length being between about 0.5 inch and 1.75 inches;

the ratio of the head diameter to the nominal shank diameter is between 2.70 and 3.37; and said plurality of rings are formed so that an average outer diameter of the crests of the rings between the middle ring and said head is greater than an average outer diameter of the crests of the rings between the middle ring and the shank tip, wherein an outer surface is formed between the crest and the root of each ring, said outer surface including an angled portion positioned at an angle relative to the longitudinal axis, and said outer surface of a majority of said plurality of rings further comprising a flat portion positioned at an angle relative to the angled portion.

2. A fastener according to claim 1, wherein a distance between the crest and the root of each of said plurality of rings is substantially the same.

3. A fastener according to claim 1, wherein said plurality of rings comprises greater than about 10 rings per inch of length along said shank.

4. A fastener according to claim 3, wherein said plurality of rings comprises between about 10 and 50 rings per inch of length along said shank.

5. A fastener according to claim 4, wherein said plurality of rings comprises between about 20 and 40 rings per inch of length along said shank.

6. A fastener according to claim 1, wherein the outer diameter of the crest of each ring generally decreases at a rate of between about 0.0026 and 0.015 inch per inch of length of said shank from the uppermost ring to the lowermost ring.

7. A fastener according to claim 6, wherein the outer diameter of the crest of each ring generally decreases at a rate of about 0.004 inch per inch of length of said shank from the uppermost ring to the lowermost ring.

8. A fastener according to claim 1, wherein the nominal shank diameter is between about 0.050 and 0.113 inch.

9. A fastener according to claim 8, wherein the nominal shank diameter is between about 0.060 and 0.113 inch.

10. A fastener according to claim 9, wherein the nominal shank diameter is between about 0.070 and 0.113 inch.

11. A fastener according to claim 1, wherein an angle formed between the longitudinal axis and a line intersecting the crests of a majority of the rings is between about 0.13° and 0.52°.

12. A fastener according to claim 1, wherein the angle is substantially the same for each surface.

13. A fastener according to claim 12, wherein the angle is between about 18° and 20°.

14. A fastener according to claim 1, wherein the length is between about 0.75 inch and 1.75 inches.

15. The fastener of claim 1, in combination with a pallet, said pallet comprising:

a plurality of bottom boards having generally parallel top and bottom surfaces, the bottom surfaces of which are positioned to be in horizontal surface engaging orientation when said pallet is supported on a horizontal surface;

a plurality of blocks having generally parallel top and bottom surfaces, the bottom surfaces of which are disposed in engaged relation to the top surfaces of said bottom boards;

a plurality of middle boards having generally parallel top and bottom surfaces, the bottom surfaces of which are disposed in engagement with the upper surfaces of said blocks;

a plurality of top boards having generally parallel top and bottom surfaces, the bottom surfaces of which are disposed in engagement with the top surfaces of said middle boards;

wherein a plurality of said fasteners of claim 1 are used in securing said top boards to said middle boards.

16. A fastener comprising:

a head having a head diameter, a top surface, and a bottom surface;

a single elongate shank having a nominal shank diameter, said shank being integral with said head and extending from the bottom surface of said head along a longitudinal axis, said shank including a tip opposite said head; and a plurality of rings extending outwardly from said shank, each ring having a crest and a root, with the crest being located closer to said head than the root, said plurality of rings having a middle ring located substantially in the center of said rings, wherein the nominal shank diameter is between about 0.050 and 0.113 inch;

said fastener has a length defining the distance from the top surface of said head to the shank tip, the length being between about 0.5 inch and 1.75 inches;

the ratio of the head diameter to the nominal shank diameter is between 2.70 and 3.37; and said plurality of rings are formed so that an average outer diameter of the crests of the rings between the middle ring and said head is greater than an average outer diameter of the crests of the rings between the middle ring and the shank tip, wherein an outer surface is formed between the crest and the root of each ring, said outer surface including an angled portion positioned at an angle relative to the longitudinal axis, and said outer surface of a majority of said plurality of rings further comprising a flat portion positioned at an angle relative to the angled portion.

17. A fastener according to claim 16, wherein a distance between the crest and the root of each of said plurality of rings is substantially the same.

18. A fastener according to claim 16, wherein said plurality of rings comprises greater than about 10 rings per inch of length along said shank.

19. A fastener according to claim 18, wherein said plurality of rings comprises between about 10 and 50 rings per inch of length along said shank.

20. A fastener according to claim 19, wherein said plurality of rings comprises between about 20 and 40 rings per inch of length along said shank.

21. A fastener according to claim 16, wherein the outer diameter of the crest of each ring generally decreases at a rate of between about 0.0026 and 0.015 inch per inch of length of said shank from the uppermost ring to the lowermost ring.

22. A fastener according to claim 21, wherein the outer diameter of the crest of each ring generally decreases at a rate of about 0.004 inch per inch of length of said shank from the uppermost ring to the lowermost ring.

23. A fastener according to claim 16, wherein an angle formed between the longitudinal axis and a line connecting the crest of the uppermost ring and the crest of the lowermost ring is between about 0.13° and 0.52°.

24. A fastener according to claim 16, wherein the angle is substantially the same for each surface.

25. A fastener according to claim 24, wherein the angle is between about 18° and 20°.

26. A fastener according to claim 16, wherein the nominal shank diameter is between about 0.060 and 0.113 inch.

27. A fastener according to claim 26, wherein the nominal shank diameter is between about 0.070 and 0.113 inch.

28. A fastener according to claim 16, wherein the length is between about 0.75 inch and 1.75 inches.

29. The fastener of claim 16, in combination with a pallet, said pallet comprising:
   a plurality of bottom boards having generally parallel top and bottom surfaces, the bottom surfaces of which are positioned to be in horizontal surface engaging orientation when said pallet is supported on a horizontal surface;
   a plurality of blocks having generally parallel top and bottom surfaces, the bottom surfaces of which are disposed in engaged relation to the top surfaces of said bottom boards;
   a plurality of middle boards having generally parallel top and bottom surfaces, the bottom surfaces of which are disposed in engagement with the upper surfaces of said blocks;
   a plurality of top boards having generally parallel top and bottom surfaces, the bottom surfaces of which are disposed in engagement with the top surfaces of said middle boards;
   wherein a plurality of said fasteners of claim 16 are used in securing said top boards to said middle boards.

* * * * *